March 15, 1966  J. C. GITS  3,240,385
MOLDED ARTICLES AND METHODS OF MAKING SAME
Filed April 2, 1963
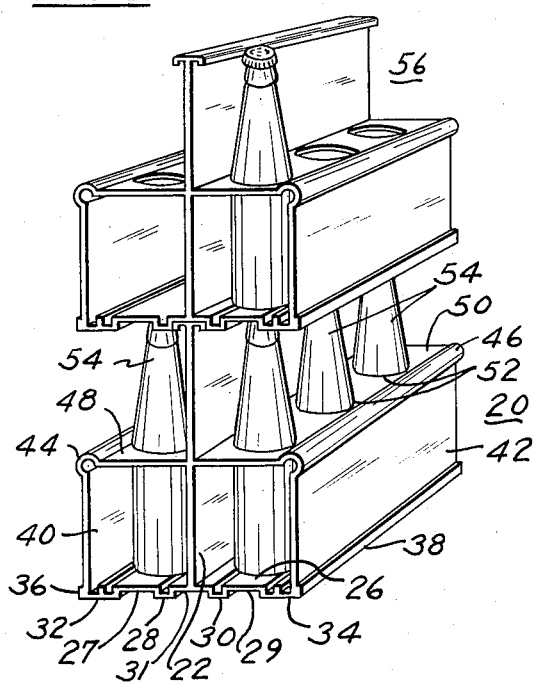
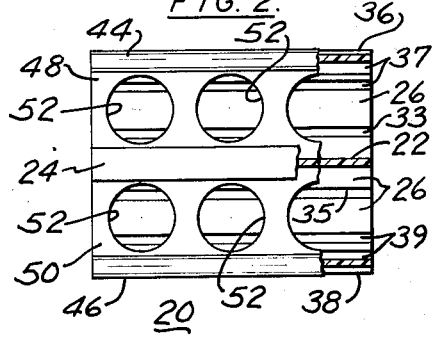
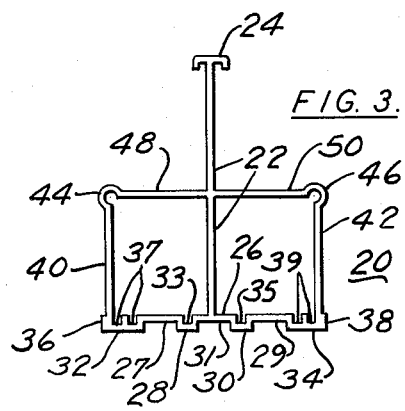
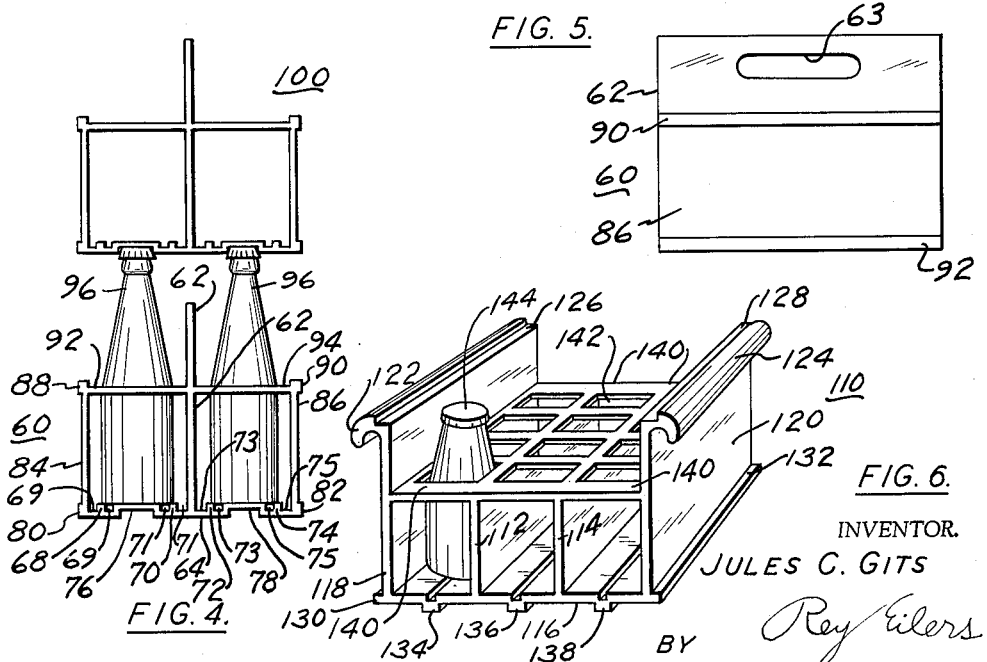
INVENTOR.
JULES C. GITS
BY Rey Eilers
ATTORNEY.

United States Patent Office 3,240,385
Patented Mar. 15, 1966

3,240,385
MOLDED ARTICLES AND METHODS OF
MAKING SAME
Jules C. Gits, 702 Kenilworth, Glen Ellyn, Ill.
Filed Apr. 2, 1963, Ser. No. 270,095
5 Claims. (Cl. 220—116)

This invention relates to improvements in molded articles and methods of making same. More particularly, this invention relates to improvements in bottle carriers and methods of making same.

It is, therefore, an object of the present invention to provide an improved bottle carrier and a method of making same.

Bottles containing soft drinks and other beverages are customarily displayed and sold in small bottle carriers which hold a number of those bottles. For example, bottles containing soft drinks are frequently displayed and sold in small bottle carriers which can hold six, eight or twelve of those bottles; and those bottle carriers are usually made from paper, from metal, or from injected plastic material. The bottle carriers which are made from paper are incapable of withstanding heavy impact, and they tend to have short lives. Further, those bottle carriers can not be sterilized after they have once been used. The bottle carriers which are made from metal are expensive, and they are easily bent and deformed. The bottle carriers which are made from plastic material have the best properties and qualities but those bottle carriers are costly. As a result, it would be desirable to provide a bottle carrier which could be made from plastic material but which would be made inexpensively. The present invention provides such a bottle carrier; and it is, therefore, an object of the present invention to provide a bottle carrier which can be made from plastic material but which can be made inexpensively.

The present invention makes it possible to form bottle carriers from plastic material and yet form those bottle carriers inexpensively by making those bottle carriers so they can be extruded. Specifically, the present invention makes bottle carriers so all portions thereof extend longitudinally and can be formed by an extrusion die. In making the bottle carriers, a continuous and elongated extrusion is formed with a cross section identical to that of the desired bottle carriers; and then that extrusion is cut into sections of the desired length, and bottle-receiving openings are formed in those sections. It is, therefore, an object of the present invention to provide a bottle carrier which can be formed as part of a continuous extrusion and then cut to length and perforated.

The bottle carrier provided by the present invention has recesses formed in the bottom thereof; and those recesses are disposed and dimensioned so they can accommodate the tops of bottles which are held in the next-lower bottle carrier of a stack of cartons. Those recesses can coact with the tops of those bottles to help hold the stacked bottle carriers against tilting. It is, therefore, an object of the present invention to provide a bottle carrier with recesses in the bottom thereof that are disposed and dimensioned to accommodate the tops of bottles which are held by the next-lower bottle carrier of a stack of bottle carriers.

The bottle carrier provided by the present invention has laterally-extending ribs adjacent the upper and lower edges of the side walls thereof. Those ribs perform a dual function, namely, they stiffen the bottle carrier, and they space the side walls of that carton away from nearby objects. In spacing the side walls of the bottle carrier away from nearby objects, those laterally-extending ribs protect indicia on those side walls. It is, therefore, an object of the present invention to provide a bottle carrier with laterally-extending ribs adjacent the upper and lower edges of the side walls thereof.

Other and further objects and advantages of the present invention should become apparent from an examination of the drawing and accompanying description.

In the drawing and accompanying description some preferred embodiments of the present invention are shown and described but it is to be understood that the drawing and accompanying description are for the purpose of illustration only and do not limit the invention and that the invention will be defined by the appended claims.

In the drawing,

FIG. 1 is a perspective view of two bottle carriers that have been made in accordance with the principles and teachings of the present invention and that are stacked in vertical array, FIG. 2 is a partially broken-away, plan view of the lower of the bottle carriers of FIG. 1, FIG. 3 is an end elevational view of the bottle carrier shown in FIG. 2, FIG. 4 is an end elevational view of two further bottle carrier that have been made in accordance with the principles and teachings of the present invention, FIG. 5 is a side elevational view of the lower bottle carrier of FIG. 4, and FIG. 6 is a perspective view of a still further bottle carrier that has been made in accordance with the principles and teachings of the present invention.

Referring to FIGS. 1–3 in detail, the numeral 20 generally denotes one form of bottle carrier that is made in accordance with the principles and teachings of the present invention. That bottle carrier has an upright portion 22 which serves as the backbone for that bottle carrier and which also serves as a partition. The numeral 24 denotes the handle for the bottle carrier 20, and that handle projects horizontally outwardly from the upper edge of the upright portion 22 and then depends downwardly at the elongated edges thereof. As a result, the handle 25 is generally C-shaped in cross section.

The numeral 26 denotes the bottom of the bottle carrier 20; and that bottom has an elongated recess 27 therein at one side of the upright portion 22 and has an elongated recess 29 therein at the opposite side of that upright portion. Those elongated recesses are disposed and dimensioned to accommodate the tops of bottles which are held by the next-lower bottle carrier of a stack of bottle carriers. The elongated recess 27 is defined by an elongated, generally U-shaped rib 28 and by an elongated, generally U-shaped rib 32. The rib 32 is wider than the rib 28, and it has an upwardly-extending reinforcing rib therein. The elongated recess 29 is defined by an elongated, generally U-shaped rib 30 and by an elongated, generally U-shaped rib 34. The rib 34 is wider than the rib 30, and it has an upwardly-extending reinforcing rib therein. The ribs 28 and 30 define an elongated recess 31 in the bottom 26; and that recess is disposed and dimensioned to accommodate the handle 24 of a next-lower bottle carrier of a stack of bottle carriers. The ribs 28, 30, 32 and 34 make the bottom 26 of the bottle carrier 20 sturdy and rugged.

The rib 28 defines an elongated recess 33 in the upper surface of the bottom 26, and the rib 30 defines an elongated recess 35 in that upper surface. The rib 32 and the reinforcing rib associated therewith define elongated recesses 37 in the upper surface of the bottom 26, and the rib 34 and the reinforcing rib associated therewith define elongated recesses 39 in that upper surface. The elongated recesses 33, 35, 37 and 39 are desirable because they enable any water on bottles held by the bottle carrier 20 to drain away from those bottles and then drain out one end or the other of that bottle carrier.

A side wall 40 extends upwardly from the rib 32, and a side wall 42 extends upwardly from the rib 34. Those side walls are shown as being coextensive with the bottom 26 and with the upright portion 22. An elongated rib 36 projects laterally outwardly from the lower edge of the side wall 40, and an elongated rib 38 projects laterally outwardly from the lower edge of the side wall 42. An elongated rounded rib 44 is provided at the upper edge of the side wall 40, and that rib projects laterally outwardly beyond that side wall. An elongated rounded rib 46 is provided at the upper edge of the side wall 42, and that rib projects laterally outwardly beyond that side wall. The side walls 40 and 42 have the same height, and hence the rounded ribs 44 and 46 are disposed at the same level. A deck 48 extends inwardly from the rounded rib 44 to the upright portion 22; and a deck 50 extends inwardly from the rounded rib 46 to that upright portion. Those decks and the rounded ribs 44 and 46 coact with the upright portion 22 to provide lateral stability for the side walls 40 and 42; and those decks and those rounded ribs coact with those side walls to provide lateral stability for that upright portion.

Openings 52 of circular form are provided in the decks 48 and 50; and those openings will be dimensioned to readily accommodate bottles such as the bottles 54. The diameters of the openings 52 will be slightly larger than the diameters of the bottles 54, but will be close enough to the diameters of those bottles to enable the decks 48 and 50 to hold the bottles 54 in alinement and in properly spaced relation.

The numeral 56 generally denotes a bottle carrier which is identical to the bottle carrier 20. As indicated by FIG. 1, the handle 24 of the bottle carrier 20 extends into the recess 31 of the bottle carrier 56. Also, the tops of the bottles 54 held by the bottle carrier 20 extend into the elongated recesses 27 and 29 of the carton 56. The handle 24 of the bottle carrier 20 and the bottles 54 carried by that bottle carrier will enable that bottle carrier to support the bottle carrier 56 when those bottle carriers are in stacked array.

In forming the bottle carriers 20 and 56, plastic material is extruded from an extrusion die in the form of an elongated, continuous extrusion which has the cross section shown by FIG. 3. That extrusion will be continuous in nature, and it will not have the openings 52 therein. That extrusion will be cut into sections of the desired length and will have the openings 52 formed in the decks 48 and 50 thereof, as by a punching or drilling operation.

Indicia of an ornamental or advertising nature can be suitably applied to the outer faces of the side walls 40 and 42. The laterally-projecting ribs 36 and 44 will protect the indicia on the outer face of the side wall 40, and the laterally-projecting ribs 38 and 46 will protect the indicia on the outer face of the side wall 42. As a result, the bottle carrier 20 can be used repeatedly and yet have a fresh and attractive appearance.

Referring to FIGS. 4 and 5 in detail, the numeral 60 generally denotes a second preferred form of bottle carrier that is made in accordance with the principles and teachings of the present invention. That bottle carrier has an upright portion 62 which is generally similar to, but shorter than, the upright portion 22 of the bottle carrier 20; and that upright portion serves as the backbone for the bottle carrier 60. An elongated, finger-receiving slot 63 is provided in the upper part of the upright portion 62; and that slot is close enough to the upper edge of that upright portion to enable a user's fingers to extend through that slot while the user's palm overlies the upper edge of that upright portion.

The bottom of the bottle carrier 60 is denoted by the numeral 64; and it has an elongated recess 76 therein at one side of the upright portion 62 and has an elongated recess 78 therein at the opposite side of that upright portion. An elongated stiffening rib 68 extends upwardly from the bottom 64, and that rib is disposed outwardly of the recess 76. An elongated stiffening rib 70 extends upwardly from the bottom 64, and that rib is disposed between the recess 76 and the upright portion 62. An elongated stiffening rib 72 extends upwardly from the bottom 64, and that rib is disposed between the upright portion 62 and the recess 78. A further elongated stiffening rib 74 extends upwardly from the bottom 64, and that rib is disposed outwardly of the recess 78.

The stiffening rib 68 coacts with the adjacent portions of the bottom 64 of the carton 60 to define two elongated recesses 69; and the stiffening rib 70 coacts with the adjacent portions of that bottom to define two elongated recesses 71. The stiffening rib 72 coacts with the adjacent portions of the bottom 64 to define two elongated recesses 73; and the stiffening rib 74 coacts with the adjacent portions of that bottom to define two elongated recesses 75. The elongated recesses 69, 71, 73 and 75 are desirable because they enable any water on bottles held by the bottle carrier 60 to drain away from those bottles and then drain out one end or the other of that bottle carrier.

A side wall 84 extends upwardly from the bottom 64 at one side of the upright portion 62, and a side wall 86 extends upwardly from the bottom 64 at the opposite side of that upright portion. An elongated rib 80 projects laterally from the side wall 84, and an elongated rib 82 projects laterally from the side wall 86; and those ribs are located adjacent the lower edges of those side walls. An elongated rib 88 projects laterally from the side wall 84, and an elongated rib 90 projects laterally from the side wall 86; and those ribs are located adjacent the upper edges of those side walls.

A deck 92 extends inwardly from the upper edge of the side wall 84 to the upright portion 62; and a deck 94 extends inwardly from the upper edge of the side wall 86 to that upright portion. Those decks coact with the upright portion 62 to provide lateral stability for the side walls 84 and 86; and those decks coact with those side walls to provide lateral stability for that upright portion. Suitable openings, similar to the openings 52 in the bottle carrier 20, will be provided in the decks 92 and 94; and those openings will be dimensioned to loosely accommodate bottles 96.

Indicia of an ornamental or advertising nature can be suitably applied to the outer faces of the side walls 84 and 86. The laterally-projecting ribs 88 and 80 will protect the indicia on the outer face of the side wall 84; and the laterally-projecting ribs 90 and 82 will protect the indicia on the outer face of the side wall 86. As a result, the bottle carrier 60 can be used repeatedly and yet have a fresh and attractive appearance.

The numeral 100 denotes a bottle carrier which is identical to the bottle carrier 60. As indicated particularly by FIG. 4, the recesses 76 and 78 of the bottle carrier 100 will accommodate the tops of the bottles 96. As a result, those recesses will coact with those bottles to provide lateral stability for stacked arrays of bottle carriers.

The bottle carriers 60 and 100 will be made by forming a continuous and elongated extrusion of plastic material. That extrusion will have the cross section shown in FIG. 4. That extrusion will be continuous in nature, and it will not have any bottle-receiving openings therein. That extrusion will be cut into sections of the desired length and will have bottle-receiving openings formed in the decks 92 and 94 thereof, as by a punching or drilling operation.

Referring to FIG. 6 in detail, the numeral 110 generally denotes a third form of bottle carrier that is made in accordance with the principles and teachings of the present invention. That bottle carrier has two upright portions 112 and 114 which serve as the backbone for that bottle carrier and which also serve as partitions for that bottle carrier. Those upright portions extend upwardly from the bottom 116 of the bottle carrier 110; and those upright portions are disposed intermediate the front and rear edges of that bottle carrier. A side wall 118 also extends upwardly from the bottom 116; and that side wall is disposed rearwardly of the upright portion 112. A side wall 120 also extends upwardly from the bottom 116; and that side wall is disposed forwardly of the upright portion 114.

The side walls 118 and 120 project upwardly above the levels of the tops of the upright portions 112 and 114, as shown particularly by FIG. 6. The upper portion of the side wall 118 extends rearwardly from the plane of that side wall and then inclines downwardly in arcuate fashion to define a finger-receiving portion 122. The upper portion of the side wall 120 extends forwardly from the plane of that side wall and then inclines downwardly in arcuate fashion to constitute a finger-receiving portion 124. The under surfaces of the finger-receiving portions 122 and 124 are smooth and will readily accommodate the fingers of any person desiring to lift and carry the bottle carrier 110. An elongated recess 126 is formed adjacent the top of the side wall 118; and that recess is wider than the thickness of that side wall. As a result, the outer limit of the elongated recess 126 is disposed outwardly of the outer face of the side wall 118. An elongated recess 128 is formed adjacent the top of the side wall 120; and that recess is wider than the thickness of that side wall. As a result, the outer limit of the elongated recess 128 is disposed outwardly of the outer face of the side wall 120.

A laterally-projecting rib 130 is formed on the bottle carrier 110 adjacent the lower portion of the side wall 118. That laterally-projecting rib is dimensioned so the outer edge thereof is disposed slightly inwardly of a vertical plane defined by the outer limit of the elongated recess 126. Hence, the rib 130 can fit nicely within the elongated recess 126 of a next-lower bottle carrier in a stack of bottle carriers. A laterally-projecting rib 132 is formed on the bottle carrier 110 adjacent the lower portion of the side wall 120. That laterally-projecting rib is dimensioned so the outer edge thereof is disposed slightly inwardly of a vertical plane defined by the outer limit of the elongated recess 128. Hence, the rib 132 can fit nicely within the elongated recess 128 of a next-lower bottle carrier in a stack of bottle carriers. This means that the bottle carrier 110 can be nicely and solidly stacked upon a bottle carrier of similar structure and dimensions.

The numeral 134 denotes an elongated, hollow rib which is part of, and which projects downwardly below the lower face of, the bottom 116 of the bottle carrier 110; and that rib is disposed intermediate the upright portion 112 and the side wall 118. A second elongated, hollow rib 136 projects downwardly below the lower face of the bottom 116; and that rib is disposed intermediate the upright portion 112 and the upright portion 114. A third elongated, hollow rib 138 projects downwardly from the lower face of the bottom 116; and that rib is disposed intermediate the upright portion 114 and the side wall 120. The ribs 134, 136 and 138 stiffen the bottle carrier 110, and they also space the lower face of the bottom 116 upwardly and away from any water or moisture on a floor on which that bottle carrier is placed. Further, those ribs will enable any water on bottles held by the bottle carrier 110 to drain away from those bottles and then drain out one end or the other of that bottle carrier.

The numeral 140 denotes decks which are atop the upright portions 112 and 114, which span the spaces between those upright portions, and which also span the spaces between those upright portions and the side walls 118 and 120. Those decks can, conveniently, be made as one continuous element which extends from the inner face of the side wall 118 to the inner face of the side wall 120. The decks 140 will coact with the upright portions 112 and 114 and with the side walls 118 and 120 to provide lateral stability for those upright portions and for those side walls. A number of openings 142 are provided in the decks 140; and those openings are intended to accommodate bottles such as the bottles 144. In the particular form of bottle carrier shown, the bottles 144 are generally square in plan; and hence the openings 142 are generally square. The upright portions 112 and 114 subdivide the bottle carrier 110 into three elongated sections; and the openings 140 are grouped in three rows which correspond to those three sections.

The side walls 118 and 120 can be dimensioned so the elongated recesses 126 and 128 are spaced from the upper face of the bottom 116 of the bottle carrier 110 distances which equal the height of a bottle 144 plus the height of the rib 136. Where this is done, the under faces of the laterally-projecting ribs 130 and 132 can seat solidly within the elongated recesses 126 and 128 of a next-lower carton in a stack of bottle carriers and the ribs 134, 136 and 138 can engage the tops of the bottles 144 in that next-lower bottle carrier.

In forming the bottle carrier 110, plastic material is extruded from an extrusion die in the form of an elongated, continuous extrusion which has the cross section shown by FIG. 6. That extrusion will be continuous in nature, and it will not have the openings 142 therein. That extrusion will then be cut into sections of the desired length, and it will have the openings 142 formed in the decks 140 thereof, as by a punching or drilling operation.

Indicia of an ornamental or advertising nature can be suitably applied to the outer faces of the side walls 118 and 120. The finger-receiving portion 122 will serve as a laterally-projecting rib and will coact with the laterally-projecting rib 130 to protect the indicia on the outer face of the side wall 118. The finger-receiving portion 124 will serve as a laterally-projecting rib and will coact with the laterally-projecting rib 132 to protect indicia on the outer face of the side wall 120. As a result, the bottle carrier can be used repeatedly and yet have a fresh and attractive appearance.

It will be noted that all portions of the bottle carriers 20, 56, 60, 100 and 110 extend longitudinally of those bottle carriers. As a result, all of those portions can be formed by an extruding operation; and hence those bottle carriers can be formed inexpensively. Further, it will be noted that all portions of those bottle carriers tend to interact to make those bottle carriers sturdy and rugged. The overall result is that the bottle carriers provided by the present invention will be rugged and sturdy but will be inexpensive.

The bottle carriers 20, 56, 60, 100 and 110 will preferably be made from thermoplastic material. While different kinds of thermoplastic materials can be used, each of those materials will make those bottle carriers sturdy and rugged, will make them resistant to water, and will give them an attractive appearance.

The sizes and shapes of the openings in the decks of the bottle carriers will be selected to enable those openings to accommodate the goods which are to be carried by those bottle carriers. Thus, those openings can be made to accommodate cans, boxes, cases or cartons, can be made square, ovate, polygonal or irregular in configuration, and can be made so they are large, medium or small.

Also, the bottle carriers provided by the present invention can be made so the overall dimensions thereof are the same as those of presently-used bottle carriers. This is desirable because it enables those bottle carriers to fit presently-used distributing, displaying and selling practices and procedures.

Whereas the drawing and accompanying description have shown and described three preferred embodiments of the present invention it should be apparent to those skilled in the art that various changes may be made in the form of the invention without affecting the scope thereof.

What I claim is:
1. A bottle carrier that can support a plurality of bottles and that comprises:
(a) an elongated upright portion,
(b) a finger-receiving portion adjacent the upper edge of said upright portion,
(c) said finger-receiving portion extending laterally on opposite sides of said upright portion and then depending downwardly at the elongated edges thereof to have a C-shaped cross section,
(d) a bottom that projects laterally on opposite sides of said upright portion adjacent the lower edge of said upright portion,
(e) said bottom having an elongated recess in the under surface thereof that is parallel to and in register with said upright portion and that is dimensioned to accommodate the finger-receiving portion of a next-lower bottle carrier in a stack of bottle carriers,
(f) said bottom having two elongated recesses in the under surface thereof that are disposed laterally on opposite sides of and extend parallel to said upright portion and that are dimensioned to accommodate the tops of bottles held by said next-lower bottle carrier,
(g) said bottom having elongated stiffening ribs thereon parallel to the upright portion,
(h) a pair of elongated recesses in the upper surface of said bottom that are disposed laterally on opposite sides of and extend parallel to said upright portion and that are adapted to collect water on the surface of bottles held by said bottle carrier and to guide said water to one end or the other of said bottle carrier,
(i) side walls extending upwardly from said bottom and spaced laterally on opposite sides of and extending parallel to said upright portion,
(j) decks that extend from said side walls, adjacent the upper edges of said side walls, to said upright portion,
(k) said decks being disposed below the level of said finger-receiving portion,
(l) said decks coacting with said side walls to provide lateral stability for said upright portion, and said decks cooperating with said upright portion to provide lateral stability for said side walls,
(m) said decks having openings therein which can accommodate bottles,
(n) rounded elongated ribs that project laterally outwardly from said side walls adjacent the upper edges of said side walls,
(o) further elongated ribs that project laterally outwardly from said side walls adjacent the lower edges of said side walls,
(p) said elongated laterally projecting ribs protecting the outer faces of said side walls from contact with adjacent objects,
(q) the upright portion, finger receiving portion, bottom including the upper and lower surface recesses therein and ribs thereon, side walls including the laterally projecting ribs thereon, and deck excluding the openings therein being of constant cross section in planes normal to the upright portion, whereby the bottle carrier can be formed by extrusion.

2. A bottle carrier that can support a plurality of bottles and that comprises:
(a) an elongated upright portion,
(b) a finger-receiving portion adjacent the upper edge of said upright portion,
(c) a bottom that projects laterally on opposite sides of said upright portion adjacent the lower edge of said upright portion,
(d) said bottom having an elongated recess in the under surface thereof that is parallel to and in register with said upright portion and that is dimensioned to accommodate the finger-receiving portion of a next-lower bottle carrier in a stack of bottle carriers,
(e) said bottom having two elongated recesses in the under surface thereof that are disposed laterally on opposite sides of and extend parallel to said upright portion and that are dimensioned to accommodate the tops of bottles held by said next-lower bottle carrier,
(f) said bottom having elongated stiffening ribs thereon parallel to the upright portion,
(g) side walls extending upwardly from said bottom and spaced laterally on opposite sides of and extending parallel to said upright portion,
(h) decks that extend from said side walls, adjacent the upper edges of said side walls, to said upright portion,
(i) said decks being disposed below the level of said finger-receiving portion,
(j) said decks coacting with said side walls to provide lateral stability for said upright portion, and said decks cooperating with said upright portion to provide lateral stability for said side walls,
(k) said decks having openings therein which can accommodate bottles,
(l) elongated ribs that project laterally outwardly from said side walls adjacent the upper and lower edges of said side walls,
(m) said elongated laterally projecting ribs protecting the outer faces of said side walls from contact with adjacent objects,
(n) the upright portion, finger receiving portion, bottom including the upper and lower surface recesses therein and ribs thereon, side walls including the laterally projecting ribs thereon, and deck excluding the openings therein being of constant cross section in planes normal to the upright portion, whereby the bottle carrier can be formed by extrusion.

3. A bottle carrier that can support a plurality of bottles and that comprises:
(a) an elongated upright portion,
(b) a finger-receiving portion adjacent the upper edge of said upright portion,
(c) a bottom that projects laterally on opposite sides of said upright portion adjacent the lower edge of said upright portion,
(d) said bottom having an elongated recess in the under surface thereof that is parallel to and in register with said upright portion and that is dimensioned to accommodate the finger-receiving portion of a next-lower bottle carrier in a stack of bottle carriers,
(e) said bottom having elongated recesses in the under surface thereof that are dimensioned to accommodate the tops of bottles held by a next-lower bottle carrier in a stack of bottle carriers,
(f) said bottom having elongated stiffening ribs thereon parallel to the upright portion,
(g) side walls extending upwardly from said bottom and spaced laterally on opposite sides of and extending parallel to said upright portion,
(h) decks that extend from said side walls, adjacent the upper edges of said side walls, to said upright portion,
(i) said decks coacting with said side walls to provide lateral stability for said upright portion, and said decks cooperating with said upright portion to provide lateral stability for said side walls,
(j) said decks having openings therein which can accommodate bottles,
(k) elongated ribs that project laterally outwardly from said side walls adjacent the upper and lower edges of said side walls,
(l) said elongated laterally projecting ribs protecting the outer faces of said side walls from contact with adjacent objects,
(m) said elongated recesses in said under surface of said bottom being adapted to coact with the finger-receiving portion and with the tops of bottles of said next-lower bottle carrier to hold said bottle carrier against tilting, (n) the upright portion, finger receiving portion, bottom including the upper and lower surface recesses therein and ribs thereon, side walls including the laterally projecting ribs thereon, and deck excluding the openings therein being of constant cross section in planes normal to the upright portion, whereby the bottle carrier can be formed by extrusion.

4. A bottle carrier that can support a plurality of bottles and that comprises:
   (a) an elongated upright portion,
   (b) a finger-receiving portion adjacent the upper edge of said upright portion,
   (c) a bottom that projects laterally on opposite sides of said upright portion adjacent the lower edge of said upright portion,
   (d) said bottom having elongated recesses in the under surface thereof that are dimensioned to accommodate the tops of bottles held by a next-lower bottle carrier in a stack of bottle carriers,
   (e) said bottom having elongated stiffening ribs thereon parallel to the upright portion,
   (f) side walls extending upwardly from said bottom and spaced laterally on opposite sides of and extending parallel to said upright portion,
   (g) decks that extend from said side walls, adjacent the upper edges of said side walls, to said upright portion,
   (h) said decks coacting with said side walls to provide lateral stability for said upright portion, and said decks cooperating with said upright portion to provide lateral stability for said side walls,
   (i) said decks having openings therein which can accommodate bottles,
   (j) elongated ribs that project laterally outwardly from said side walls adjacent the upper and lower edges of said side walls,
   (k) said elongated laterally projecting ribs protecting the outer faces of said side walls from contact with adjacent objects,
   (l) the upright portion, finger receiving portion, bottom including the upper and lower surface recesses therein and ribs thereon, side walls including the laterally projecting ribs thereon, and deck excluding the openings therein being of constant cross section in planes normal to the upright portion, whereby the bottle carrier can be formed by extrusion,
   (m) projections extending laterally from opposite sides of the upright wall, the projections having a coextensive upper surface, and
   (n) a recess in the lower surface of the bottom wall for receiving the projections of an identical bottle carrier to enable vertical stacking of a plurality of bottle carriers.

5. A bottle carrier for supporting a plurality of articles comprising:
   (a) a bottom wall having two parallel side edges,
   (b) two parallel side walls extending upwardly from the side edges,
   (c) means defining a deck spaced above the bottom wall and extending between the side walls,
   (d) a plurality of openings through the deck for positioning articles resting upon the bottom wall and projecting through the openings,
   (e) at least one upright wall extending upwardly at right angles from the bottom wall to the deck,
   (f) the upright wall being parallel to and spaced from the side walls,
   (g) a plurality of reinforcing ribs on the bottom wall,
   (h) the reinforcing ribs extending parallel to the side walls,
   (i) projections extending laterally from opposite sides of the upright wall, the projections having a coextensive upper surface, and
   (k) a recess in the lower surface of the bottom wall for receiving the projections of an identical bottle carrier to enable vertical stacking of a plurality of bottle carriers,
   (l) the cross section of all parts of the bottle carrier collectively being constant in all planes normal to the side walls, exclusive of the holes through the deck to enable formation of the bottle carrier by extrusion.

References Cited by the Examiner
UNITED STATES PATENTS

| | | | |
|---|---|---|---|
| 1,744,552 | 1/1930 | Katzinger | 220—23.6 |
| 2,525,633 | 10/1950 | Arnett | 220—104 |
| 2,574,983 | 11/1951 | Reed | 220—97 |
| 2,606,703 | 8/1952 | Olson | 220—97 |
| 2,661,499 | 12/1953 | James et al. | 18—47.5 |
| 2,728,484 | 12/1955 | Farrington | 220—116 |
| 2,804,234 | 8/1957 | Lachance | 220—116 |
| 2,821,327 | 1/1958 | Glazer | 220—23.6 X |
| 2,970,715 | 2/1961 | Kappel et al. | 220—97 X |
| 2,995,271 | 8/1961 | Frater et al. | 220—97 |
| 3,055,543 | 9/1962 | Russo | 220—116 |
| 3,080,611 | 3/1963 | Jarrett et al. | 18—47.5 |

FRANKLIN T. GARRETT, *Primary Examiner.*